United States Patent
Nakaya et al.

(10) Patent No.: US 7,396,227 B2
(45) Date of Patent: Jul. 8, 2008

(54) HOT RUNNER SPRUE

(75) Inventors: Masatoshi Nakaya, Okazaki (JP); Shozo Tabata, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 322 days.

(21) Appl. No.: 11/354,950

(22) Filed: Feb. 16, 2006

(65) Prior Publication Data

US 2006/0204610 A1    Sep. 14, 2006

(30) Foreign Application Priority Data

Feb. 23, 2005    (JP)    ............................... 2005-047332

(51) Int. Cl.
*B29C 45/18* (2006.01)
(52) U.S. Cl. ...................... 425/562; 425/563
(58) Field of Classification Search .............. 425/562, 425/563

See application file for complete search history.

(56) References Cited

U.S. PATENT DOCUMENTS 5,180,594 A * 1/1993 Trakas ..................... 425/549
6,793,480 B2 * 9/2004 Dominka .................. 425/563

FOREIGN PATENT DOCUMENTS

JP    4-67923    3/1992

* cited by examiner

*Primary Examiner*—Tim Heitbrink
(74) *Attorney, Agent, or Firm*—Finnegan, Henderson, Farabow, Garrett & Dunner, LLP (57) ABSTRACT

When a molding machine nozzle is separated from a nozzle touch surface of a hot runner sprue, application of external pressure on resin in a resin supply passage is stopped. At this time, back pressure of resin in the resin supply passage that is received by a seal exceeds atmospheric pressure, and thus the seal is moved to seal an opening of the resin supply passage from the inside of the resin supply passage. As a result, leakage of resin from the hot runner sprue is inhibited, and mixing of air in the resin in a runner is also inhibited.

16 Claims, 10 Drawing Sheets

HOT RUNNER SPRUE

BACKGROUND OF THE INVENTION

1. Field of the Invention

The present invention relates to a hot runner sprue.

2. Description of the Related Art

Figure 14:
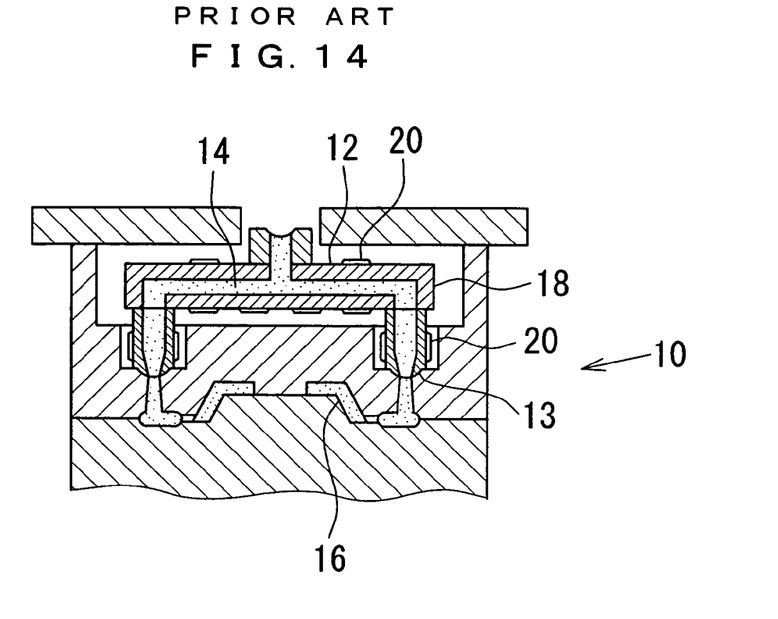
FIG. 14 is a cross sectional view of a prior injection molding mold provided with a hot runner.

Use of a hot runner, as in an injection molding mold 10 for thermoplastic resin shown in FIG. 14, allows a manifold 12 and a nozzle 13 to be heated and resin 14 to be held constantly in a molten state. Further, utilization of the hot runner allows the molded part to be ejected from the injection molding mold 10 while only chilling a part molding cavity 16. The injection molding mold 10 is provided with a hot runner block 18 that ensures a flow path for the resin 14 at the time of injection. Note that, the element indicated by reference numeral 20 in FIG. 14 is a heater (for an example, refer to Japanese Patent Application Publication No. JP-A-4-67923 (Pages 1 and 2, and FIGS. 1 and 2)).

Figure 15:
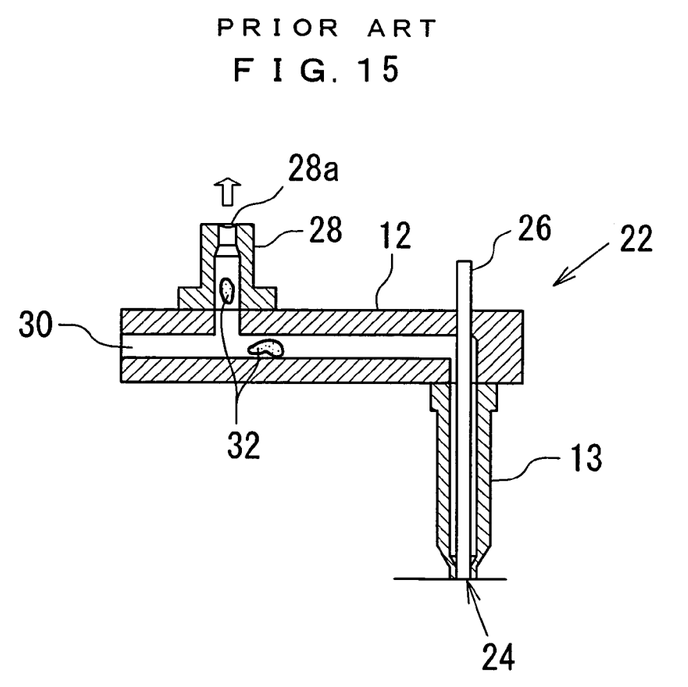
FIG. 15 is a cross sectional view illustrating a problem that occurs in the prior hot runner.

A standard valve gate hot runner block 22, as shown in FIG. 15, normally has a structure in which the supply of resin into the part molding cavity is controlled by blocking a gate 24 of the nozzle 13 using a stem 26. However, with this structure, when the molding machine nozzle is separated from the nozzle touch unit 28a of the hot runner sprue 28 to change the mold or the like, resin in the manifold 12 and the hot runner sprue 28 returns and leaks from the nozzle touch unit 28a. As a result, the pressure within the manifold 12 and the hot runner sprue 28 drops down toward atmospheric pressure. Further, air enters into the hot runner sprue 28 and the manifold 12 from the nozzle touch unit 28a and forms air pockets 32 in the runner 30. The next time molding is carried out, these air pockets 32 cause silver streaks (one type of molding defect) in the molded part. Such silver streaks will continue being formed in the molded parts until all of the resin within the nozzle 13, the manifold 12, and the hot runner sprue 28 has been ejected from the gate 24, and completely replaced with resin containing no air pockets. As a result, in the case of molded parts with a small production quantity for each lot, the reject rate will increase.

SUMMARY OF THE INVENTION

The present invention has been conceived of in light of the above described problem, and it is an object thereof to inhibit resin from leaking when a molding machine nozzle is separated from a hot runner sprue. Further, another object of the present invention is to inhibit entry of air into a runner which occurs if resin leaks, so as to avoid silver streaks from being formed in molded parts.

In order to solve the above problem, the present invention provides a hot runner sprue that structures a connector that connects to a molding machine nozzle and that feeds resin supplied from the molding machine nozzle to a manifold of a hot runner block. This hot runner sprue includes a hot runner sprue main body that is formed with a nozzle touch surface that touches the molding machine nozzle and a resin supply passage. The resin supply passage connects to the manifold and has an opening at one end that opens to the nozzle touch surface. Further, the hot runner sprue includes a seal that is provided in the resin supply passage. The seal does not obstruct resin flow when resin is being supplied from the molding machine nozzle. In addition, the seal receives back pressure of resin in the resin supply passage when supply of resin from the molding machine nozzle is stopped and seals the opening of the resin supply passage from the inside of the resin supply passage.

According to the present invention, when application of external pressure on the resin in the resin supply passage of the hot runner sprue is stopped when the molding machine nozzle is separated from the nozzle touch surface of the hot runner sprue, the seal receives the back pressure of the resin within the resin supply passage that exceeds atmospheric pressure. Accordingly, the seal is moved to seal the opening of the resin supply passage from the inside of the resin supply passage. As a result, leakage of resin from the hot runner sprue is inhibited, and entry of air into the runner is also inhibited.

Note that, when resin is supplied from the molding machine nozzle, the seal receives the pressure of the resin supplied from the molding machine nozzle and thus recedes back into the resin supply passage away from the opening of the resin supply passage. Accordingly, resin can be fed into the resin supply passage of the hot runner sprue. The seal is provided in a manner that does not cause any obstruction to resin flow when resin is supplied from the molding machine nozzle, and thus resin can smoothly fill the part molding cavity of the mold.

Moreover, according to the present invention, a stepped portion having a diameter that increase discontinuously may be formed in the resin supply passage. This stepped portion is formed in the resin supply passage between the opening and the manifold. Further, the seal may include a main seal and an auxiliary seal. The main seal is moved from the manifold side of the resin supply passage to the opening side and placed into contact with a shoulder of the stepped portion of the resin supply passage. The auxiliary seal protrudes from the main seal and fits without clearance against a portion extending from the stepped portion of the resin supply passage to the opening.

According to this configuration, the main seal of the seal receives the back pressure of the resin in the resin supply passage and is thus moved from the manifold side to the opening side and placed into contact with the shoulder of the stepped portion of the resin supply passage. As a result, the opening is sealed from the inside of the resin supply passage without obstructing the touch of the molding machine nozzle. In addition, the auxiliary seal that protrudes from the main seal is fitted without clearance against the portion extending from the stepped portion of the resin supply passage to the opening portion. Accordingly, the opening of the resin supply passage is sealed with a flush surface being formed with the nozzle touch surface.

In addition, according to the present invention, the main seal of the seal may include a pressure receiving portion that ensures resin flow when resin is supplied from the molding machine nozzle, and that receives the back pressure of the resin in the resin supply passage when supply of resin from the molding machine nozzle is stopped. With this configuration, the main seal can be moved from the manifold side toward the opening side and placed into contact with the shoulder of the stepped portion of the resin supply passage so as to inhibit leakage of resin. Moreover, the main seal does not hinder resin flow when resin is supplied from the molding machine nozzle, and thus injection molding can be performed smoothly.

In addition, according to the present invention, a plurality of guide protrusions extending in a resin flow direction may preferably be formed on an inner wall of the resin supply passage. Further, the main seal of the seal may preferably be a slide pin whose sliding movement is guided by the guide protrusions.

With this configuration, when resin is supplied from the molding machine nozzle, the resin flows in spaces formed between the guide protrusions and the slide pin whose sliding movement is guided by the guide protrusions. Accordingly, resin flow in the resin supply passage is ensured. Further, the main seal has its sliding movement guided by the guide protrusions. Accordingly, when supply of resin from the molding machine nozzle is stopped, the back pressure of the resin in the resin supply passage is received by the main seal, whereby the main seal is moved from the manifold side toward the opening side and placed in contact with the shoulder of the stepped portion of the resin supply passage. Moreover, when resin is supplied from the molding machine nozzle, the seal receives the pressure of the resin supplied from the molding machine nozzle and recedes back into the resin supply passage from the opening of the resin supply passage. Accordingly, resin can be smoothly fed to the resin supply passage of the hot runner sprue.

Furthermore, according to the present invention, the auxiliary seal of the seal may be held by the main seal so as to be capable of protrusion from/insertion within the main seal. In addition, the main seal may preferably be provided with resin flow diverting means for causing the auxiliary seal to protrude from the main seal when supply of resin from the molding machine nozzle is stopped and back pressure of resin in the resin supply passage is applied to the auxiliary seal.

With this configuration, the main seal receives the back pressure of the resin in the resin supply passage when the supply of resin from the molding machine nozzle is stopped, and is moved from the manifold side to the opening side and placed in contact with the shoulder of the stepped portion of the resin supply passage. At this time, the auxiliary seal also receives the back pressure of the resin via the resin flow diverting means. Further, the auxiliary seal that protrudes from the main seal is fitted without clearance against the portion extending from the stepped portion of the resin supply passage to the opening, and thus the opening of the resin supply passage is sealed with a flush surface being formed with the nozzle touch surface. Moreover, when resin is supplied from the molding machine nozzle, the auxiliary seal receives the supply pressure of the resin from the molding machine nozzle. As a result, the auxiliary seal is inserted within the main seal, and the main seal also separates away from the shoulder of the stepped portion of the resin supply passage. The main seal then recedes back into the resin supply passage away from the opening of the resin supply passage, whereby resin flow to the resin supply passage is ensured.

In the above configuration, the auxiliary seal may be configured by a section of a sub-slide pin that slides within and is guided by a cylinder chamber formed in the main seal, and that is able to protrude from/insert within a tip of the main seal. Further, the main seal may be provided with a connecting hole that connects between the cylinder chamber and the resin supply passage. The connecting hole functions as the resin flow diverting means.

With this configuration, the main seal receives the back pressure of the resin in the resin supply passage when the supply of resin from the molding machine nozzle is stopped, and thus is moved from the manifold side to the opening side and placed in contact with the shoulder of the stepped portion of the resin supply passage. At this time, the sub-slide pin that slides within and is guided by the cylinder chamber also receives the back pressure of the resin that enters the cylinder chamber via the connecting hole. Further, the section of the sub-slide pin is caused to protrude from the main seal and is fitted without clearance against the portion extending from the stepped portion of the resin supply passage to the opening.

As a result, the opening of the resin supply passage is sealed with a flush surface being formed with the nozzle touch surface.

Moreover, it is preferable that the main seal is supported by the guide protrusions formed in the inner wall of the resin supply passage so as to be capable of rotating about a central axis. In addition, it is preferable that one, two or more of the connecting holes are formed at positions that are not blocked by the guide protrusions regardless of the rotational position of the main seal with respect to the resin supply passage.

According to the present invention, the main seal is supported by the guide protrusions formed in the inner wall of the resin supply passage so as to be capable of rotation around the central axis. In order to simplify the structure, no structural member for stopping rotation of the main seal is provided. Furthermore, one, two or more of the connecting holes are provided at positions that are not blocked by the guide protrusions. Accordingly, regardless of the rotational position of the main seal with respect to the resin supply passage, the auxiliary seal receives back pressure of the resin of the resin supply passage via the connecting holes when the supply of resin from the molding machine nozzle is stopped, and is pushed to protrude from the main seal.

Moreover, according to the present invention, it is preferable that a spring that urges the auxiliary seal in a direction in which the auxiliary seal protrudes from the main seal is provided in the cylinder chamber. If this configuration is adopted, the auxiliary seal is pushed out from the main seal by the back pressure of the resin supplied via the connecting hole and the elastic force of the spring. Moreover, even if the pressure in the resin supply passage drops due to resin contraction caused by cooling of the hot runner, the spring can hold the auxiliary seal so that it remains protruding from the main seal.

In addition, a pressure receiving area of the pressure receiving portion of the main seal and an opening area of the connecting hole may be determined such that the back pressure of resin received by the main seal exceeds the sum of the elastic force of the spring and the back pressure of resin received by the auxiliary seal in the cylinder chamber. If this configuration is adopted, when supply of resin from the molding machine nozzle is stopped, at first, the back pressure of the resin is received by the main seal, which is thus moved from the manifold side to the opening side and into contact with the shoulder of the stepped portion of the resin supply passage. As a result, leakage of resin from the opening is inhibited. Then, the auxiliary seal is pushed to protrude from the main seal and fits without clearance against the portion extending from the stepped portion of the resin supply passage to the opening. As a result, the opening of the resin supply passage is sealed with a flush surface being formed with the nozzle touch surface.

In addition, it is preferable that the auxiliary seal is configured so as to seal the opening of the resin supply passage from the inside of the resin supply passage with a flush surface being formed with the nozzle touch surface.

With the above configuration, the opening of the resin supply passage is sealed by the auxiliary seal with a flush surface being formed with the nozzle touch surface. Therefore, when the molding machine nozzle has been separated away from the nozzle touch surface of the hot runner sprue and is then placed into contact with the nozzle touch surface once again, no air is trapped between the molding machine nozzle and the nozzle touch surface. Accordingly, there is no likelihood that air will enter into the runner as a result of air being trapped between the molding machine nozzle and the nozzle touch surface.

Moreover, according to the present invention, the main seal and the auxiliary seal may be formed as an integrated unit in which the auxiliary seal is fixed protruding from the main seal.

With this configuration, the main seal of the seal receives back pressure of resin in the resin supply passage and is moved from the manifold side to the opening side and placed in contact with the shoulder of the stepped portion of the resin supply passage. Accordingly, the opening is sealed from the inside of the resin supply passage. Further, the auxiliary seal protruding from the seal is fitted without clearance against the portion extending from the stepped portion of the resin supply passage to the opening, and thus the opening of the resin supply passage is sealed with a flush surface being formed with the nozzle touch surface.

Moreover, in the above configuration in which the main seal and the auxiliary seal are formed as an integrated unit, it is preferable that a ring-shaped or a groove shaped by-pass passage is provided in the shoulder of stepped portion of the resin supply passage. This by-pass passage ensures resin flow when resin is being supplied from the molding machine nozzle in a state where a section of the auxiliary seal is inserted to fit against the portion extending from the stepped portion to the opening.

With the above configuration, resin flow is ensured by the ring-shaped or groove-shaped by-pass passage in a state where the auxiliary seal is inserted against the portion that extends from the stepped portion of the resin supply passage to the opening. As a result of adopting this configuration, the seal is not required to perform a long operation stroke.

Moreover, according to the present invention, a protrusion having a shape that matches that of the by-pass passage may be formed in a surface of the main seal. This protrusion is formed in the surface that faces the shoulder of the stepped portion of the resin supply passage, and is capable of fully occupying the by-pass passage. If this configuration is adopted, when the main seal of the seal receives back pressure of the resin in the resin supply passage and is moved from the manifold side to the opening side and placed in contact with the shoulder of the stepped portion of the resin supply passage, the protrusion provided on the surface facing the shoulder of the stepped portion of the resin supply passage completely occupies the by-pass passage. As a result, there is no likelihood that air will be mixed into the resin.

Moreover, in the present invention, it is preferable that the auxiliary seal is configured so as to seal the opening of the resin supply passage from the inside of the resin supply passage with a flush surface being formed with the nozzle touch surface.

With the above configuration, the opening of the resin supply passage is sealed by the auxiliary seal with a flush surface being formed with the nozzle touch surface. Therefore, when the molding machine nozzle has been separated away from the nozzle touch surface of the hot runner sprue and is then placed into contact with the nozzle touch surface once again, no air is trapped between the molding machine nozzle and the nozzle touch surface. Accordingly, there is no likelihood that air will enter into the runner as a result of air being trapped between the molding machine nozzle and the nozzle touch surface.

In addition, the protruded auxiliary seal may be formed lower than a portion extending from the stepped portion of the resin supply passage to the nozzle touch surface.

In this case, a fine gap is formed between the nozzle touch surface and the auxiliary seal. Therefore, the auxiliary seal does not seal the opening of the resin supply passage from the inside of the opening with flush surface being formed the nozzle touch surface. However, even when air trapped in the fine gap enters into the resin, no silver streak is formed in the molded part.

Note that, it is preferable to provide a cinical projection on an upper surface of auxiliary seal. The conical projection makes the resin provided from the molding machine nozzle flow smoothly, and thereby resin flowability in the resin supply passage can be improved.

As a result of the present invention having the above described configuration, it is possible to inhibit resin from leaking when the molding machine nozzle is separated from the hot runner sprue. Further, it is also possible to inhibit entry of air into the runner which occurs if resin leaks, so as to avoid silver streaks from being formed in molded parts.

DETAILED DESCRIPTION OF THE PREFERRED EMBODIMENTS

Hereinafter, the present invention will be explained with reference to the appended drawings. Note that, structural members of the present invention that are the same as those used in the above described known art or substantially correspond thereto will be denoted with the same reference numerals and an explanation omitted.

Referring to FIGS. 1A to 3, a hot runner sprue 34 according to the present invention includes a main body 44 that has a generally cylindrical shape. The main body 44 has a body base 38 that is directly and closely fitted to a manifold 12; a body intermediate section 40 that is stacked on and aligned with the body base 38; and a body tip end 42 that is stacked on and aligned with the body intermediate section 40. The body base 38, the body intermediate section 40, and the body tip end 42 are fixed to the manifold 12 by bolts 46. A positioning pin 48 is used to accurately position the body base 38 and the body intermediate section 40 with respect to the manifold 12.

A hemispherical groove 38a is provided in a central portion of the body base 38, and a connecting hole 38b that connects with the manifold 12 is formed in a central portion of the hemispherical groove 38a.

Figure 5A:
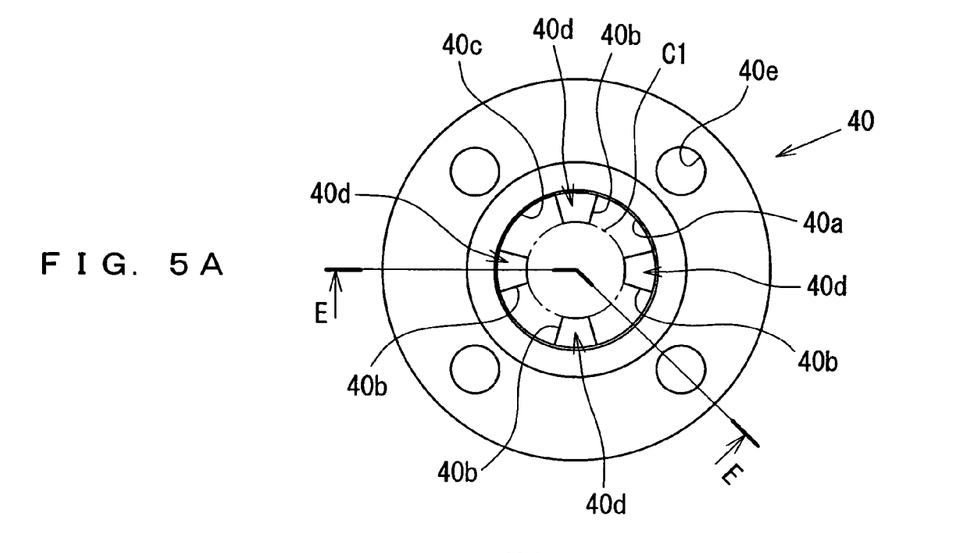
FIGS. 5A-5B show an intermediate section of a body of the hot runner sprue, with FIG. 5A being a top view of the body intermediate section, and FIG. 5B being a cross sectional view along line E-E of FIG. 5A.
Figure 5B:
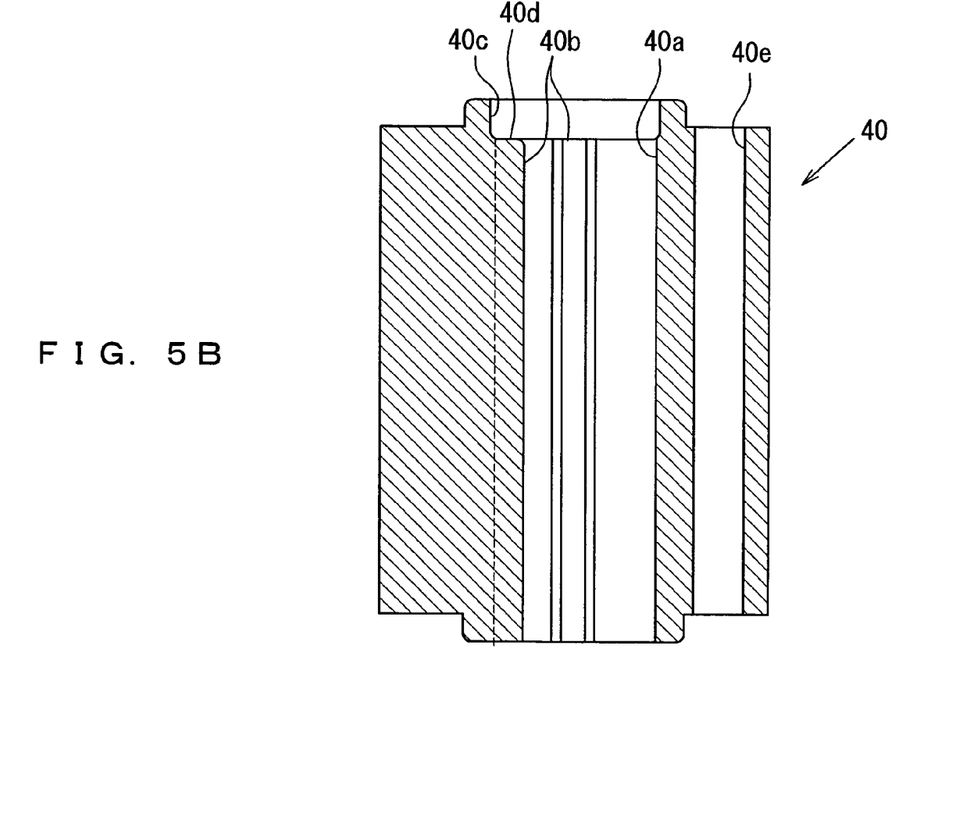

Further, as can be seen from FIGS. 5A-5B, a constant diameter hole 40a is formed to pass through a central portion of the body intermediate section 40. A plurality of guide protrusions 40b are formed in the hole 40a to extend in the axial direction (the direction in which the resin flows) of the body intermediate section 40. In the example shown in the drawing, four of the guide protrusions 40b are formed at equal distances apart (at 90 degree intervals) in the circumferential direction. The diameter of a circle Cl that connects tip ends of the guide protrusions 40b is set at a diameter that is suitable for guiding sliding movement of a slide pin 54, described later. Furthermore, the diameter of the hole 40a, as will be described later, is set to a diameter that is suitable for ensuring resin flow when resin is supplied from a molding machine nozzle 36.

A deep spot facing 40c is formed in one end of the hole 40a (the end at the side that abuts with the body tip end 42). The spot facing 40c has the same diameter or a slightly larger diameter than the hole 40a. Providing the deep spot facing 40c (i) ensures space for moving a cap 60, described hereinafter, and (ii) allows the ends of the guide protrusions 40b (the ends at the side that faces the body tip end 42) to function as a stopper surface 40d of the cap 60, described later. Further, resin flow paths PA (refer to FIGS. 2, 8) are formed between the hole 40a, each guide protrusion 40b, and the slide pin 54 described later. Note that, insertion holes 40e are provided for the bolts 46 as shown in FIGS. 5A-5B.

A recessed nozzle touch surface 42a that has an inverted-dome shape is formed in the body tip end 42 with a shape that matches a domed shape of the molding machine nozzle 36. An opening 42b (refer to FIG. 9) is formed in a central portion of the nozzle touch surface 42a. A sub-slide pin 52 can be fitted to the opening 42b without any clearance therebetween (note that, enough clearance to allow sliding movement of the sub-slide pin 52 is ensured). The diameter of the opening 42b increases discontinuously from the portion where the nozzle touch surface 42a is formed while adequate wall thickness is maintained. Accordingly, a stepped portion 42c (refer to FIG. 9) is formed. Note that, the diameter of an enlarged diameter portion 42d (refer to FIG. 9), which is formed with the stepped portion 42c of the opening 42b as a boundary edge, is the same as that of the deep spot facing 40c of the body intermediate section 40. Further, the diameter of the enlarged diameter portion 42d (and the deep spot facing 40c) is set to a diameter that is suitable for sliding contact of ribs 60e of the cap 60, described hereinafter (refer to FIGS. 8, 9).

The main body 44 that is formed by stacking and aligning the structural elements described above is formed with a resin supply passage 50 that is formed by the opening 42b and the enlarged diameter portion 42d of the body tip end 42, the deep spot facing 40c and the hole 40a of the body intermediate section 40, and the hemispherical groove 38a and the connecting hole 38b of the body base 38.

The slide pin 54 is supported in the resin supply passage 50 formed in the main body 44 by the guide protrusions 40b such that the slide pin 54 can slide in the axial direction thereof. The slide pin 54 is structured such that the sub-slide pin 52 can protrude from or be inserted within a tip end of the slide pin 54. Note that, the slide pin 54 is supported by the guide protrusions 40b so as to be capable of rotating around a central axis of the slide pin 54. Note that, no structural element is provided within the resin supply passage 50 to stop rotation of the slide pin 54.

Figure 6A:
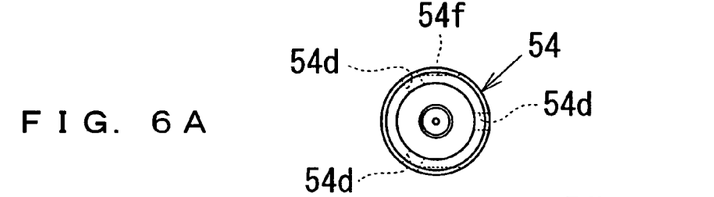
FIGS. 6A-6B show a slide pin of the hot runner sprue of FIG. 1, with FIG. 6A being a top view of the slide pin, and FIG. 6B being a side view showing a partial cross section.
Figure 6B:
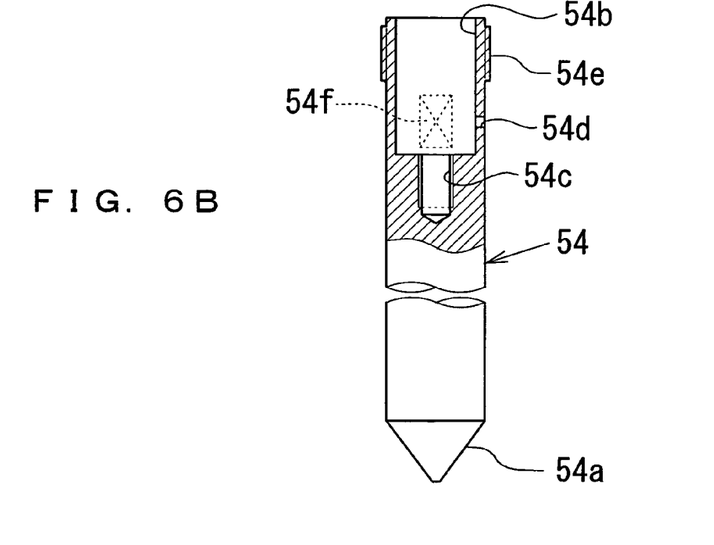

The slide pin 54, as shown in FIGS. 6A-6B, is a rod-like member with a base end 54a that has a pointed conical shape. A cylinder chamber 54b is formed within a cylindrical top end side of the slide pin 54. The diameter of the inner wall of the cylinder chamber 54b is set to allow and guide sliding movement of a large diameter base 52a (refer to FIG. 8) of the sub-slide pin 52. Further, a screw hole 54c is formed in the lower surface of the cylinder chamber 54b. The screw hole 54c is used to fix a stopper pin 56 (refer to FIG. 8) that controls the potential range of movement of the sub-slide pin 52. Moreover, connecting holes 54d are formed in the slide pin 54 and connect between the inner wall of the cylinder chamber 54b and the outer wall of the slide pin 54. In the example shown in the figures, three of the connecting holes 54d are formed at a distance apart from each other (an interval of 120 degrees) in the circumferential direction of the stopper pin wall surface that is circular. As will be described later, when the supply of resin from the molding machine nozzle 36 is stopped, the connecting holes 54d feed and apply the back pressure of the resin in the resin supply passage 50 to the large diameter base 52a of the sub-slide pin 52 in the cylinder chamber 54b. Accordingly, the sub-slide pin 52 is pushed so that it protrudes from an opening 60a of the cap 60, described later. Thus, in the embodiment of the present invention, the connecting holes 54d form a "resin flow diverting means".

Further, a screw 54e for screwing on the cap 60, described later, is formed in the upper edge of the outer wall of the slide pin 54. Note that, reference numeral 54f in FIGS. 6A-6B indicates the width of the hole for inserting a tool.

Figure 8:
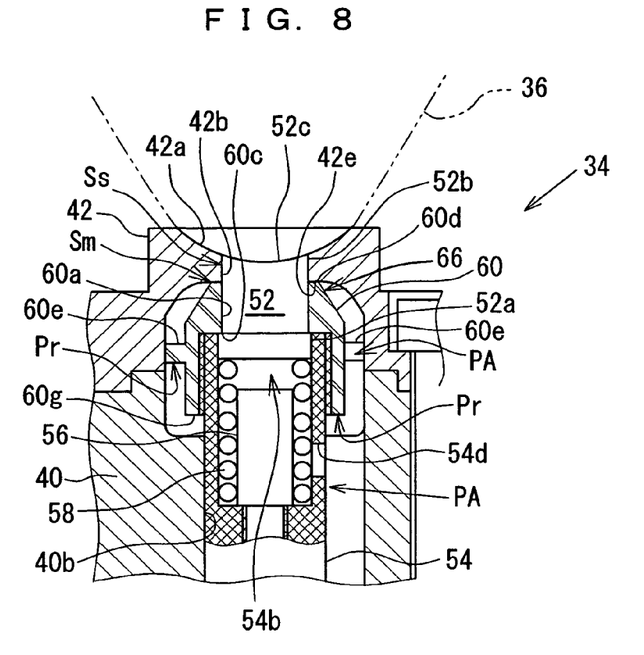
FIG. 8 shows an expanded view of main structural elements of FIG. 1B.
Figure 9:
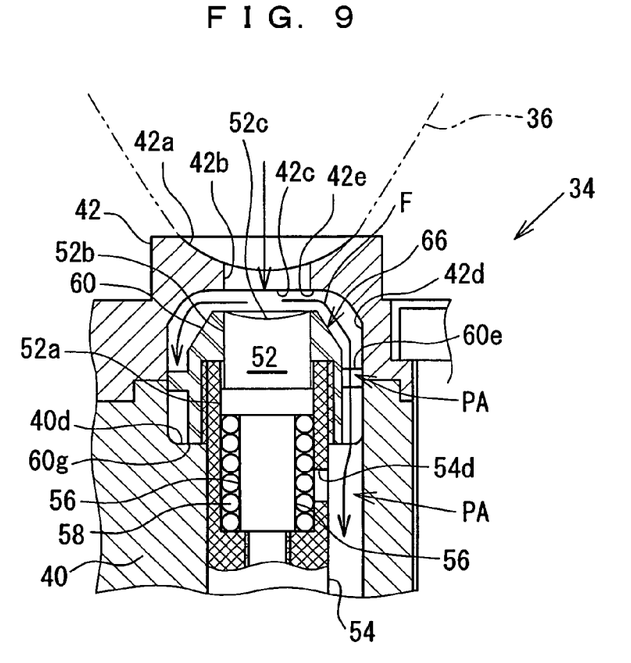
FIG. 9 shows an expanded view of main structural elements of FIG. 4.

A coil spring 58 is inserted in the cylinder chamber 54b of the slide pin 54 as shown in FIGS. 8, 9, such that the stopper pin 56 is surrounded by the coil spring 58. Further, the sub-slide pin 52 is inserted in the cylinder chamber 54b such that the large diameter base 52a is supported by the coil spring 58. In order to stop the sub-slide pin 52 from slipping out from the cylinder chamber 54b of the slide pin 54, the cap 60 is screwed onto the screw 54e of the slide pin 54.

Figure 7A:
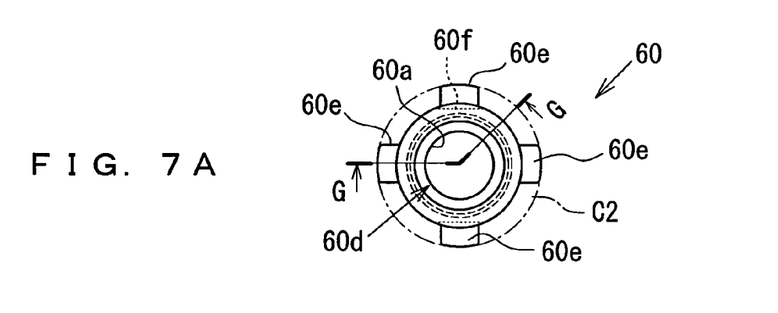
FIGS. 7A-7B show a cap of the hot runner sprue of FIG. 1, with FIG. 7A being a top view of the cap, and FIG. 7B being a cross sectional view along line G-G of FIG. 7A.
Figure 7B:
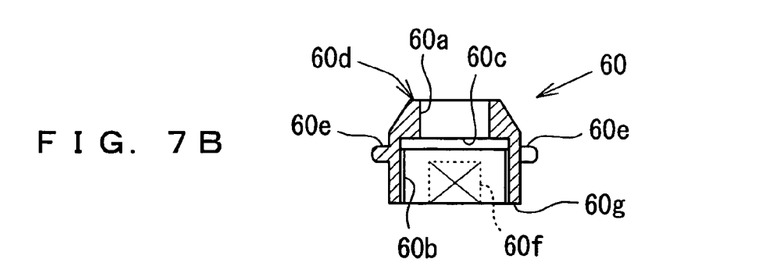

As can be seen from FIGS. 7A-7B, the opening 60a is formed in the tip end side of the cap 60. A small diameter portion 52b (refer to FIG. 8) of the sub-slide pin 52 is inserted in the opening 60a. Further, a screw hole 60b that has a diameter larger than the opening 60a is formed in the based end side of the cap 60. The screw 54e of the slide pin 54 is screwed into the screw hole 60b. The opening 60a has a diameter that is suitable for guiding sliding movement of the small diameter portion 52b of the sub-slide pin 52. The large diameter base 52a of the sub-slide pin 52 abuts with a stepped portion 60c between the opening 60a and the screw hole 60b. As a result, the sub-slide pin 52 is restrained from protruding beyond an upper surface (tip surface) 60d of the cap 60, and thus the large diameter base 52a of the sub-slide pin 52 is prevented from passing out of the opening 60a (refer to FIG. 9). Further, four ribs 60e are formed around the periphery of the cap 60 at equal distances apart in the circumferential direction. The ribs 60e configure pressure receiving portions Pr (refer to FIG. 8) that receive back pressure of the resin in the resin supply passage 50. In addition, a base surface 60g of the cap 60 also configures another pressure receiving portion Pr that receives back pressure of the resin in the resin supply passage 50 (refer to FIG. 8).

The diameter of a circle C2 that connects tip ends of the ribs 60e is set to a diameter that allows sliding contact with respect to the enlarged portion 42c of the body tip end 42, and the deep spot facing 40c of the body intermediate section 40. Further, when the ribs 60e of the cap 60 are in sliding contact with the enlarged portion 42c of the body tip end 42 or the deep spot facing 40c of the body intermediate section 40, resin flow paths PA (refer to FIGS. 2, 8) are formed between the ribs 60e.

Note that, the reference numeral 60f in FIGS. 7A-7B indicates the width across flat for insertion of a tool.

As described previously, the large diameter base 52a of the sub-slide pin 52 is guided and can slide with respect to the inner wall of the cylinder chamber 54b of the slide pin 54. When resin in not being supplied from the molding machine nozzle 36, back pressure of the resin within the resin supply passage 50 is received by sub-slide pin 52 within the cylinder chamber 54b, whereby the small diameter portion 52b is pushed to protrude out from the opening 60a of the cap 60. The tip of the small diameter portion 52b of the sub-slide pin 52 has an inverted-dome shaped recessed surface 52c that matches the dome-shaped molding machine nozzle 36. Accordingly, when the sub-slide pin 52 is fitted into the opening 42b formed in the nozzle touch surface 42a of the body tip end 42 of the main body 44, the nozzle touch surface 42a and the inverted-dome shaped recessed surface 52c form a flush surface without a step, and a close contact surface is formed with the dome shaped molding machine nozzle 36 without any clearance, as shown in FIG. 8.

Figure 1A:
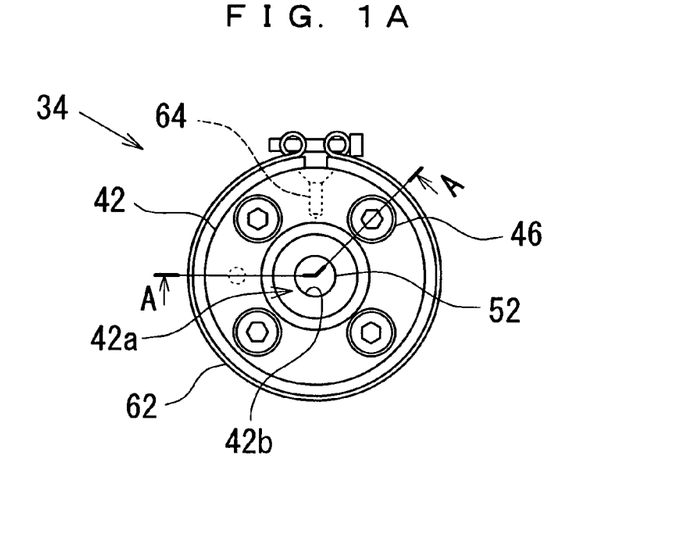
FIGS. 1A-1B show a hot runner sprue according to an embodiment of the present invention, with FIG. 1A being a top view of the sprue, and FIG. 1B showing a cross sectional view of the hot runner sprue and a manifold of a hot runner block along line A-A of FIG. 1A when supply of resin from a molding machine nozzle has been stopped.
Figure 1B:
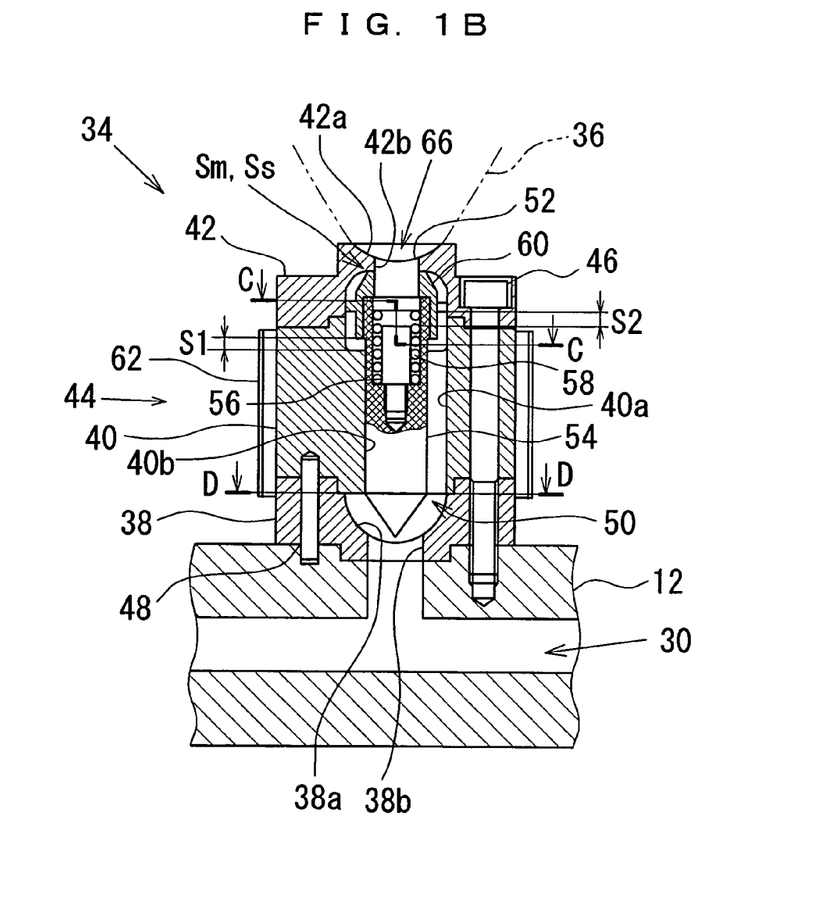

Note that, as can be seen in FIGS. 1A-1B, the present embodiment also includes a band heater 62 and a thermocouple hole 64.

As will be apparent from the above description, the sub-slide pin 52, the slide pin 54, the cap 60, etc. do not cause any obstruction to resin flow when resin is being supplied from the molding machine nozzle 36. Further, when supply of resin from the molding machine nozzle 36 is stopped, the sub-slide pin 52, the slide pin 54, the cap 60, etc. receive back pressure of the resin in the resin supply passage 50, and are moved to configure a seal 66 that seals the opening 42b from the inside of the resin supply passage 50 with a flush surface being formed with the nozzle touch surface 42a.

Moreover, a seal Sm (a metal seal) that inhibits fluid from leaking from the opening 42b is configured by the tip surface 60d of the cap 60 (refer to FIGS. 7A-7B) being in close contact with a shoulder 42e of the stepped portion formed by the body tip end 42. As a result, in the embodiment of the present invention, the slide pin 54 and the cap 60 configure a "main seal" of the seal 66.

Furthermore, the section (small diameter portion) 52b of the sub-slide pin 52 that slides in and is guided by the cylinder chamber 54b formed in the slide pin 54 protrudes from the opening 60a of the cap 60 positioned at the tip of the main seal. This small diameter portion 52b is fitted without clearance in the opening 42b formed in the body tip end 42 and thus configures a seal Ss (a metal seal) that inhibits leakage of fluid from the opening 42b and that expels air from the opening 42b. Accordingly, according to the embodiment of the present invention, the sub-slide pin 52 configures an "auxiliary seal" of the seal 66.

Next, the operation of the hot runner sprue 34 according to the embodiment of the present invention will be described with reference to FIGS. 1A to 9.

First, when the molding machine nozzle 36 is separated from the nozzle touch surface 42a of the hot runner sprue 34 when the mold is changed or the like, as shown in FIGS. 1A-1B and 8, the back pressure of the resin in the resin supply passage 50 is applied to the ribs 60e of the cap 60 and the base surface 60g (the pressure receiving portion Pr: refer to FIG. 8). As a result, the cap 60 and the slide pin 54 are moved within the resin supply passage 50 and approach the opening 42b. Then, as can be seen in FIG. 8, the tip surface 60d of the cap 60 is placed in close contract with the shoulder 42e of the shoulder portion formed in the body tip end 42 and thereby configures the seal Sm. Thus, leakage of fluid from the opening 42b is inhibited.

Further, the back pressure of the resin in the resin supply passage 50 is also applied via the connecting hole 54d to the large diameter base 52a of the sub-slide pin 52 in the cylinder chamber 54b. Thus, the large diameter base 52a of the sub-slide pin 52 separates away from the stopper pin 56 protruding from the lower surface of the cylinder chamber 54b. Then, the large diameter base 52a moves to abut with the stepped portion 60c of the cap 60, and the small diameter portion 52b of the sub-slide pin 52 protrudes from the opening 60a of the cap 60. The small diameter portion 52b is fitted without clearance in the opening 42b formed in the body tip end 42 to configure the seal Ss that inhibits leakage of fluid from the opening 42b and expels air from the opening 42b.

As described previously, the nozzle touch surface 42a of the hot runner sprue 34 and the inverted-dome shaped recessed surface 52c of the sub-slide pin 52 form a flush dome-like surface without any steps. Accordingly, when the molding machine nozzle 36 is closely fitted to the nozzle touch surface 42a of the hot runner sprue 34, the nozzle touch surface 42a and the inverted-dome shaped recessed surface 52c and the molding machine nozzle 36 closely contact without clearance. Thus, even when resin starts to be supplied from the molding machine nozzle 36, it is not possible for air to enter into the hot runner sprue 34 from the opening 42b.

When resin is supplied from the molding machine nozzle 36 that is in close contact with the nozzle touch surface 42a of the hot runner sprue 34, the supply pressure of the resin is applied to the inverted-dome shaped recessed surface 52c of the sub-slide pin 52. Since the supply pressure of the resin from the molding machine nozzle 36 is greater than the resultant force of the back pressure of the resin in the cylinder chamber 54b and the elastic force of the coil spring 58, the sub-slide pin 52 compresses the coil spring 58 and approaches toward the stopper pin 56 while forcing the resin in the cylinder chamber 54b out through connecting holes 54d. Then, the large diameter base 52a abuts with the stopper pin 56, thereby stopping movement of the large diameter base 52a of the sub-slide pin 52 in the cylinder chamber 54b. Note that, a stroke S2 of the large diameter base 52a of the sub-slide pin 52 between the point where the large diameter base 52a separates from the stepped portion 60c of the cap 60 until the point where the large diameter base 52a abuts with the stopper pin 56 of the cylinder chamber 54b is shown in FIG. 1B. Also note that the small diameter portion 52b of the sub-slide pin 52 is formed to have a length that can be fully inserted within the opening 60a of the cap 60 (in other words, the maximum protrusion amount that the sub-slide pin 52 can protrude from the tip surface 60d of the cap 60 is also equal to S2).

Even after the small diameter portion 52b of the sub-slide pin 52 has been inserted within the opening 60a of the cap 60, the supply pressure of the resin from the molding machine nozzle 36 continues to be applied to the inverted-dome shaped recessed surface 52c of the sub-slide pin 52. As a result, the supply pressure of the resin is transmitted from the sub-slide pin 52 to the slide pin 54 via the stopper pin 56. At this time, the supply pressure of the resin from the molding machine nozzle 36 is also applied to the ribs 60e of the cap 60. The supply pressure of the resin from the molding machine nozzle 36 applied to the slide pin 44 exceeds the back pressure of the resin from the resin supply passage 50, and thus the tip surface 60d of the cap 60 separates away from the shoulder 42e of the stepped portion of the body tip end 42 that configures part of the main body 44. The cap and the slide pin 54 are then pushed deep into the resin supply passage 50 with the sub-slide pin 52 completely inserted within the opening 60a of the cap 60. Further, the base surface 60g of the cap 60 abuts with the stopper surface 40d of the body intermediate section 40, whereby the slide pin 54 and the cap 60 are stopped. A stroke S1 of the cap 60 and the slide pin 54 at this time is indicated in FIG. 1B.

Figure 2:
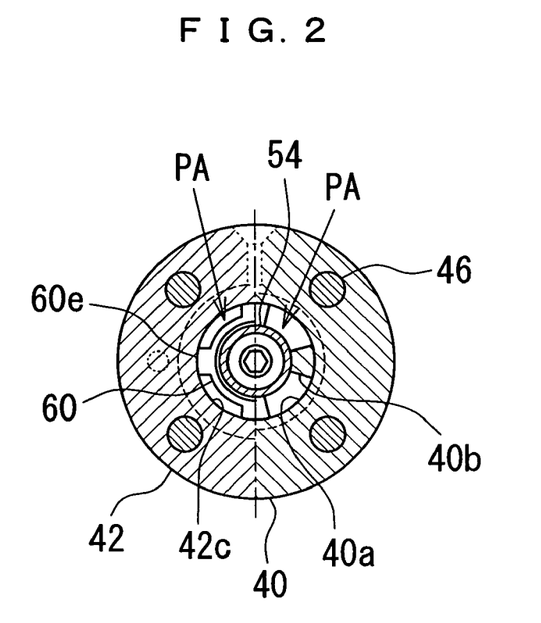
FIG. 2 is a cross sectional view along line C-C of FIG. 1B.
Figure 3:
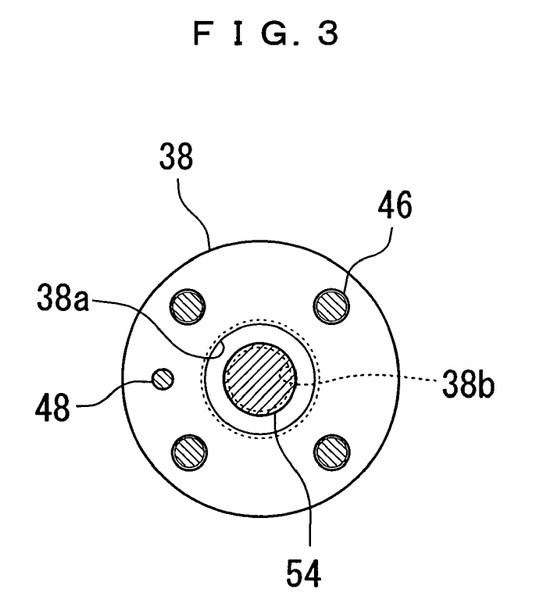
FIG. 3 is a cross sectional view along line D-D of FIG. 1B.
Figure 4:
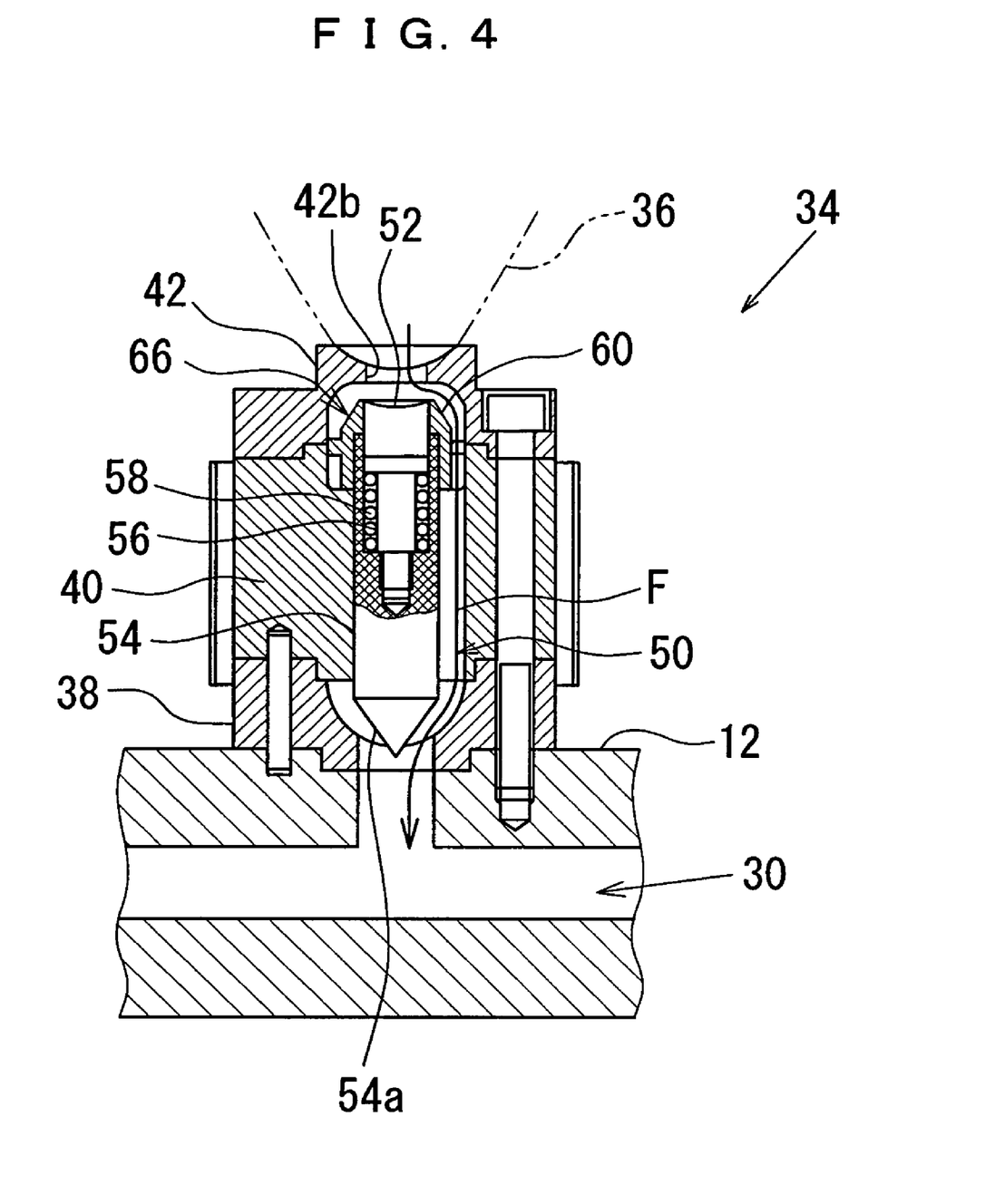
FIG. 4 is a cross sectional view of the same structural elements as in FIG. 1B when resin is being supplied from the molding machine nozzle.

As described previously, the resin flow paths PA are formed between the ribs 60e of the cap 60 and the guide protrusions 40b of the body intermediate section 40 (refer to FIGS. 2 and 9). As a result, resin supplied from the molding machine nozzle 36 flows along the resin supply passage 50 in the direction indicated by the arrow F in FIGS. 4 and 9, and then is supplied to the manifold 12.

Next, when the supply of resin from the molding machine nozzle 36 is stopped, the back pressure of the resin in the resin supply passage 50 is applied once again to the ribs 60e of the cap 60 and the base surface 60g (the pressure receiving portion Pr; refer to FIG. 8). Thus, as shown in FIGS. 1A, 1B and 8, the cap 60 and the slide pin 54 move closer to the opening 42b once again. The tip surface 60d of the cap 60 is then moved into close contact with the shoulder 42e of the stepped portion formed in the body tip end 42, thus configuring the seal Sm (refer to FIG. 8). Accordingly, leakage of fluid from the opening 42b is inhibited.

Further, the back pressure of the resin in the resin supply passage 50 is also applied via the connecting holes 54d to the large diameter base 52a of the sub-slide pin 52 in the cylinder chamber 54b. In addition, the elastic force of the coil spring 58 is also applied, thus causing the small diameter portion 52b of the sub-slide pin 52 to be pushed to protrude out from the opening 60a of the cap 60. The small diameter portion 52b fits without clearance in the opening 42b formed in the body tip end 42, thus configuring the seal Ss (refer to FIG. 8) that inhibits leakage of fluid from the opening 42b and that expels air from the opening 42b. Accordingly, even if the nozzle touch surface 42a of the hot runner sprue 34 is separated away from the molding machine nozzle 36 once again, no air is able to enter through the opening 42b.

Note that, the guide protrusion 40b of the body intermediate section 40 and the connecting holes 54d of the slide pin 54 are positioned at different positions in the circumferential direction (there is a 90 degree interval between the guide protrusions 40b and a 120 degree interval between the connecting holes 54d). As a result, when the slide pin 40 rotates within the resin supply passage 50, even if one of the connecting holes 54d is sealed by one of the guide protrusions 40d, the other two connecting holes 54d will not be blocked.

Thus, back pressure of the resin in the resin supply passage 50 is definitely applied to the large diameter base 52a of the sub-slide pin 52 within the cylinder chamber 54b via the connecting holes 54d.

The embodiment of the present invention with the above described configuration can achieve the following operational effects. According to the embodiment of the present invention, when application of external pressure on the resin in the resin supply passage 50 is stopped when the molding machine nozzle 36 is separated from the nozzle touch surface 42a of the hot runner sprue 36, the seal 66 receives the back pressure of the resin within the resin supply passage 50 that exceeds atmospheric pressure. Accordingly, the seal 66 seals the opening 42b of the resin supply passage 50 from the inside of the resin supply passage 50. As a result, leakage of resin from the hot runner sprue 34 is inhibited, and entry of air into the runner 30 is also inhibited. In addition, the opening 42b of the resin supply passage 50 is sealed by the seal 66 with a flush surface being formed with the nozzle touch surface 42a (refer to FIGS. 1A, 1B and 8). Accordingly, when the molding machine nozzle 34 has been separated away from the nozzle touch surface 42a of the hot runner sprue 34 and is then placed into contact with the nozzle touch surface 42a once again, no air is trapped between the molding machine nozzle 36 and the nozzle touch surface 42a. Accordingly, there is no likelihood that air bubbles will enter into the runner 30 as a result of air being trapped between the molding machine nozzle 36 and the nozzle touch surface 42a.

Note that, when resin is supplied from the molding machine nozzle 36, the seal 66 receives the pressure of the resin supplied from the molding machine nozzle 36 and thus recedes back into the resin supply passage 50 away from the opening 42b of the resin supply passage 50. Accordingly, resin can be fed into the resin supply passage 50 of the hot runner sprue 34. The seal 66 is provided in a manner that does not cause any obstruction to resin flow when resin is supplied from the molding machine nozzle 36 (the resin flow paths PA are provided between the ribs 60e of the cap 60 and the guide protrusions 40b of the body intermediate section 40), and thus resin can smoothly fill the part molding cavity of the mold.

Note that, the cap 60 that configures part of the main seal of the seal 66 receives the back pressure of the resin in the resin supply passage 50 and is thus moved from the manifold 12 side to the opening 42a side and placed into contact with the shoulder 42e of the stepped portion of the resin supply passage 50. As a result, the opening 42b is sealed from the inside of the resin supply passage 50 without obstructing the touch of the molding machine nozzle 36. In addition, the auxiliary seal 52 (sub-slide pin) that protrudes from the main seal (slide pin, cap) 54, 60 is fitted without clearance at a portion extending from the stepped portion 42c of the resin supply passage 50 to the opening 42b. Accordingly, as described above, the opening 42b of the resin supply passage 50 is sealed with a flush surface being formed with the nozzle touch surface 42a.

Further, the cap 60 that configures part of the main seal of the seal 66 is provided with the pressure receiving portion Pr (refer to FIG. 8). This pressure receiving portion Pr ensures resin flow when resin is supplied from the molding machine nozzle 36, while also receiving the back pressure of the resin in the resin supply passage 50 when the supply of resin from the molding machine nozzle 36 is stopped. Accordingly, the cap 60 that configures part of the main seal can be moved from the manifold 12 side toward the opening 42b side and placed into contact with the shoulder 42 of the stepped portion of the resin supply passage 50 so as to inhibit leakage of resin. Moreover, the cap 60 does not hinder resin flow when resin is supplied from the molding machine nozzle 36, and thus injection molding can be performed smoothly.

In addition, when resin is supplied from the molding machine nozzle 36, the resin flows in the spaces PA between the guide protrusions 40b and the slide pin 54 whose sliding movement is guided by the guide protrusions 40b. Accordingly, resin flow in the resin supply passage 50 is ensured.

Further, the slide pin 54 that configures part of the main seal has its sliding movement guided by the guide protrusions 40b. Accordingly, when supply of resin from the molding machine nozzle 36 is stopped, the back pressure of the resin in the resin supply passage 50 is received by the cap 60 that configures part of the main seal, whereby the cap 60 is moved from the manifold 12 side toward the opening 42b side and placed into contact with the shoulder 42e of the stepped portion of the resin supply passage 50. Moreover, when resin is supplied from the molding machine nozzle 36, the seal 66 receives the pressure of the resin supplied from the molding machine nozzle 36 and recedes back into the resin supply passage 50 from the opening 42b of the resin supply passage 50. Accordingly, resin can be smoothly fed to the resin supply passage 50 of the hot runner sprue 34.

Moreover, the main seal (slide pin, cap) 54, 60 receives the back pressure of the resin in the resin supply passage 50 when the supply of resin from the molding machine nozzle 36 is stopped, and is moved from the manifold 12 side to the opening 42b side and placed in contact with the shoulder 42e of the stepped portion of the resin supply passage 50. At this time, the auxiliary seal (sub-slide pin) 52 also receives the back pressure of the resin via the resin flow diverting means (connecting holes) 54d. Further, the auxiliary seal 52 that protrudes from the main seal 54, 60 is fitted without clearance to the portion extending from the shoulder 42c of the resin supply passage 50 to the opening 42b, and thus the opening 42b of the resin supply passage 50 is sealed with a flush surface being formed with the nozzle touch surface 42a.

Moreover, when resin is supplied from the molding machine nozzle 36, the auxiliary seal 52 receives the supply pressure of the resin from the molding machine nozzle 36. As a result, the auxiliary seal 52 is inserted within the main seal 54, 60, and the main seal 54, 60 also separates away from the shoulder 42e of the stepped portion of the resin supply passage 50. The main seal 54, 60 then recedes back into the resin supply passage 50 away from the opening 42b of the resin supply passage 50, whereby resin flow to the resin supply passage 50 is ensured.

Note that, in the embodiment of the present invention the main seal 54, 60 is supported by the guide protrusions 40b formed in the inner wall of the resin supply passage 50 so as to be capable of rotation around the central axis. However, in order to simplify the structure, no structural member for stopping rotation of the main seal 54, 60 is provided. Furthermore, since the guide protrusions 40b of the body intermediate section 40 and the connecting holes 54d of the slide pin 54 are positioned at different distances apart in the circumferential direction, regardless of the rotational position of the main seal 54, 60 with respect to the resin supply passage 50, the guide protrusions 40b do not block the connecting holes 54d. Accordingly, regardless of the rotational position of the main seal 54, 60 with respect to the resin supply passage 50, the auxiliary seal 52 receives back pressure of the resin of the resin supply passage 50 via the connecting holes 54d when the supply of resin from the molding machine nozzle 36 is stopped, and is pushed to protrude from the main seal 54, 60.

Note that, the position of the connecting holes 54d is not limited to being around the outer periphery surface of the slide pin 54. For example, one, two, or more holes may be formed that connect between the base end 54a of the slide pin 54 and the cylinder chamber 54b.

In addition, the spring 58 is provided in the cylinder chamber 54b that urges the auxiliary seal 52 to protrude from main seal 54, 60. As a result, the auxiliary seal 52 is pushed out from the main seal 54, 60 by the back pressure of the resin supplied via the connecting holes 54d and the elastic force of the spring 58. Moreover, even if the pressure in the resin supply passage 50 drops due to resin contraction caused by cooling of the hot runner 30, the spring 58 can hold the auxiliary seal 52 so that it remains protruding from the main seal 54, 60, and thus entry of air into the hot runner 30 can be reliably inhibited.

Note that, in the embodiment of the present invention, a coil spring is used for the spring 58. However, another elastic body may be used as required. Moreover, if problems related to resin contraction caused by cooling of the hot runner 30 are not expected to occur, the spring 58 may be entirely omitted.

In the above description, the operations of the main seal 54, 60 and the auxiliary seal 52 occur simultaneously. However, in the embodiment of the present invention, the pressure receiving area of the pressure receiving portion Pr (refer to FIG. 8) of the main seal 54, 60 and the opening area of the connecting holes 54d may be determined such that the back pressure of the resin received by the main seal 54, 60 exceeds the sum of the elastic force of the spring 58 and the back pressure of the resin received by the auxiliary seal 52 (the large diameter base 52a) in the cylinder chamber 54b.

If this configuration is adopted, when supply of resin from the molding machine nozzle 36 is stopped, at first, the back pressure of the resin in the resin supply passage 50 is received by the main seal 54, 60, which is moved into contact with the shoulder 42e of the stepped portion of the resin supply passage 50, thus inhibiting leakage of resin from the opening 42b. Then, the auxiliary seal 52 is pushed to protrude from the main seal 54, 60 and fits without clearance against the portion extending from the stepped portion 42c of the resin supply passage 50 to the opening 42b. As a result, the opening 42b of the resin supply passage 50 is sealed with a flush surface being formed with the nozzle touch surface 42a.

Figure 10:
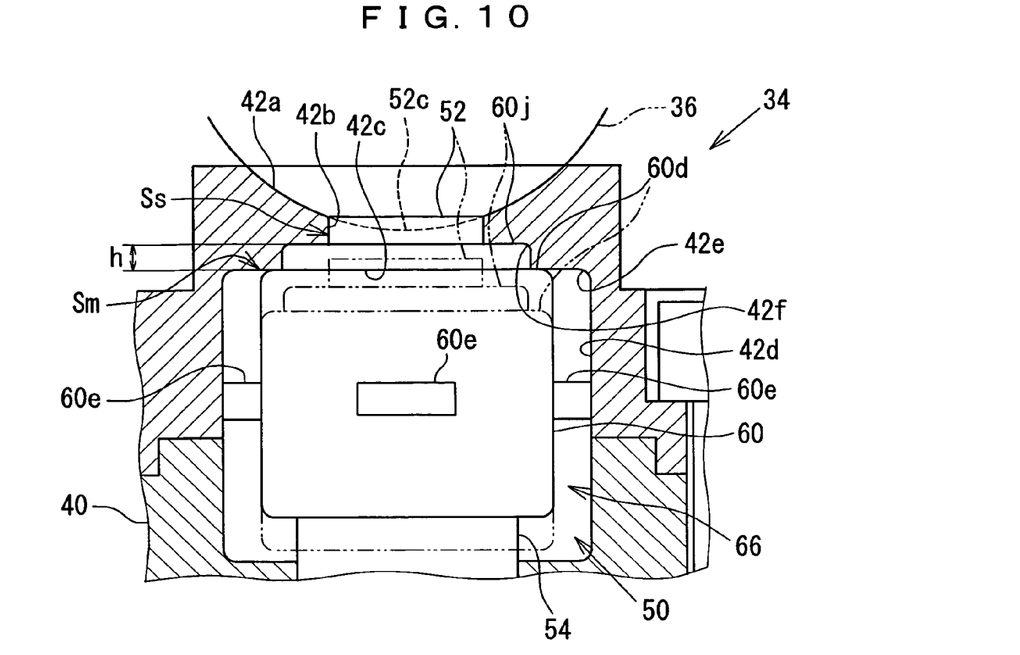
FIG. 10 shows an expanded view of main structural elements of an applied example of the hot runner sprue according to the embodiment of the present invention.
Figure 11:
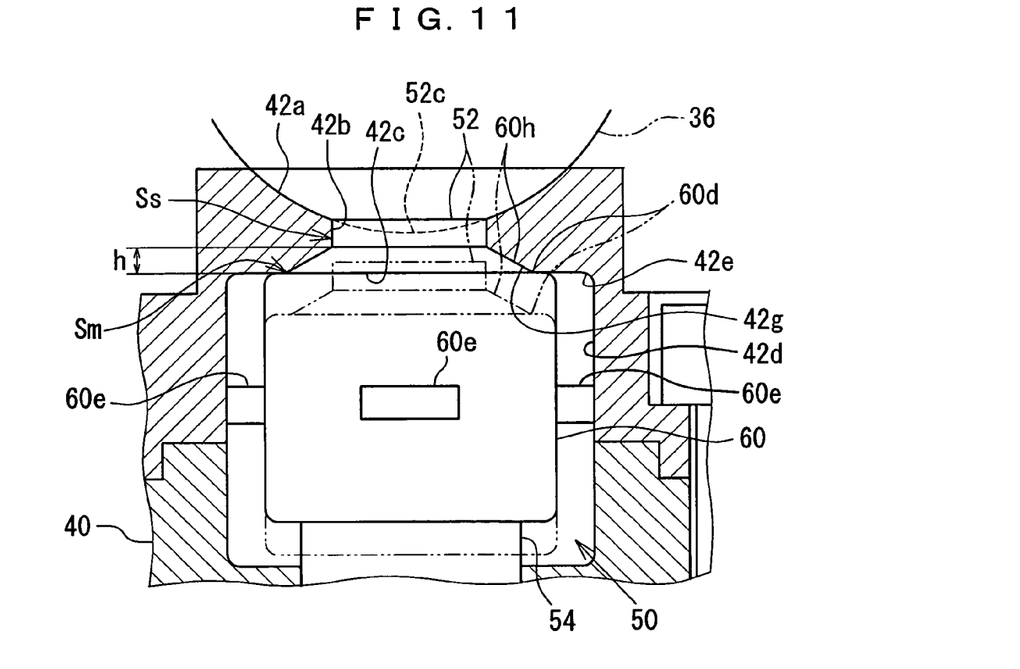
FIG. 11 shows an expanded view of main structural elements of another applied example of the hot runner sprue according to the embodiment of the present invention.

FIGS. 10 and 11 show expanded views of main structural elements of applied examples of the hot runner sprue 34 shown in FIGS. 1A to 9. Note that, structural elements of these applied examples that are the same or substantially correspond to those in the example of FIGS. 1A to 9 are denoted with the same reference numerals and an explanation is omitted.

First, in the applied example of FIG. 10, the slide pin 54 and the sub-slide pin 52 are configured as an integrated unit in which the sub-slide pin 52 that configures the auxiliary seal is fixed protruding from the tip of the slide pin 54 that configures part of the main seal. Accordingly, unlike the example of FIGS. 1A to 9 the structural elements that support protrusion/insertion of the auxiliary seal 52 from/into the main seal 54 are not utilized, and the cap 60 and the slide pin 54 are integrated. Furthermore, a deep spot facing 42f is formed in the shoulder 42e of the stepped portion of the resin supply passage 50. The diameter of the deep spot facing 42f is larger than the diameter of the opening 42b but smaller than the diameter of the enlarged diameter portion 42d. In addition, a protrusion 60j is formed in a face of the cap 60 integrated with the slide pin 54, namely, the face of the cap 60 that faces the shoulder 42e of the stepped portion of the resin supply passage 50. This protrusion 60j matches the deep spot facing 42f. Note that, the depth of the deep spot facing 42f and the height of the protrusion 60j are both (h).

With this configuration, the upper surface 60d of the cap 60 is placed in contact with the shoulder 42e of the stepped portion of the resin supply passage 50 to configure the seal Sm that inhibits leakage of fluid from the opening 42b. At this time, the deep spot facing 42f is sealed by the protrusion 60j without any clearance therebetween. Furthermore, when the seal 66 configured from the integrated slide pin 54, the sub-slide pin 52, and the cap 60, is moved inwards in the resin supply passage 50 (as shown by the two-dot dash line of FIG. 10) by a distance longer than the depth of the deep spot facing 42f (the height of the ring-shaped protrusion 60j), the protrusion 60j is separated away from the deep spot facing 42f. When a section of the sub-slide pin 52 is inserted to the portion extending from the stepped portion 42c to the opening 42b, the deep spot facing 42f configures a ring-shaped by-pass passage around the sub-slide pin 52 that ensures resin flow when resin is supplied from the molding machine nozzle 36.

Moreover, in addition to providing the deep spot facing 42f in the example of FIG. 10, unlike the example of FIGS. 1A to 9, the diameter of the cap 60 is set to be constant in order to ensure the area necessary for the seal Sm.

In this way, in the example of FIG. 10 as well, the cap 60 that configures the main seal of the seal 66 receives back pressure of the resin in the resin supply passage 50 and is moved into contact with the shoulder 42e of the stepped portion of the resin supply passage 50. Accordingly, the opening 42b is sealed from the inside of resin supply passage 50.

Further, the auxiliary seal 52 protrudes from the main seal 54 and is fitted without clearance to the portion extending from the stepped portion 42c of the resin supply passage 50 to the opening 42b. As a result, the opening 42b of the resin supply passage 50 is sealed with a flush surface being formed with the nozzle touch surface 42a. In addition, as shown by the two-dot dash line in the figure, when a section of the auxiliary seal is inserted to the portion extending from the stepped portion 42c of the resin supply passage 50 to the opening 42b, the ring shaped by-pass passage (deep spot facing) 42f ensures resin flow. As a result, the seal 66 is not required to perform a long operation stroke.

In addition, the protrusion 60j that can be inserted to fully occupy the ring-shaped by-pass passage 42f is formed to protrude on the surface that faces the shoulder 42e of the stepped portion of the resin supply passage 50. The protrusion 60j has a shape that matches the shape of the by-pass passage 42f. Accordingly, when the main seal 54 of the seal 66 is moved into contact with the shoulder 42e of the stepped portion of the resin supply passage 50 as a result of receiving the back pressure of the resin in the resin supply passage 50, the protrusion 60j provided on the face that faces the shoulder 42e of the stepped portion of the resin supply passage 50 is inserted and completely occupies the by-pass passage 42f. Accordingly, mixing of air into the resin is inhibited.

Thus, according to the example of FIG. 10, it is possible to simplify the structure of the seal 66 by integrating the slide pin 54, the sub-slide pin 52, and the cap 60, and achieve the same operational effects as the example of FIGS. 1 to 9.

Note that, in the example shown in FIG. 11, the deep spot facing 42f of FIG. 10 is replaced with a chamfered surface 42g, and the protrusion 60j of FIG. 10 is replaced with a protrusion 60h that has a circular truncated cone shape that matches the shape of the chamfered surface 42g. With this configuration, the same operational effects as the example of FIG. 10 can be achieved. Further, the by-pass passage does not necessarily have to be ring-shaped, and a groove, or a plurality of grooves, that are divided in the circumferential direction may be provided.

Furthermore, if the length of the operation stroke that the seal 66 is required to perform is not a matter of concern, the deep spot facing 42f and the protrusion 60j or the chamfered surface 42g and the protrusion 60h that configure the by-pass passage may be omitted. In this case, when the seal 66 is moved to a point at which the auxiliary seal 52 is completely removed from the portion extending from the stepped portion 42e of the resin supply passage 50 to the opening 42b, it is possible to ensure resin flow when resin is supplied from the molding machine nozzle 36.

Figure 12A:
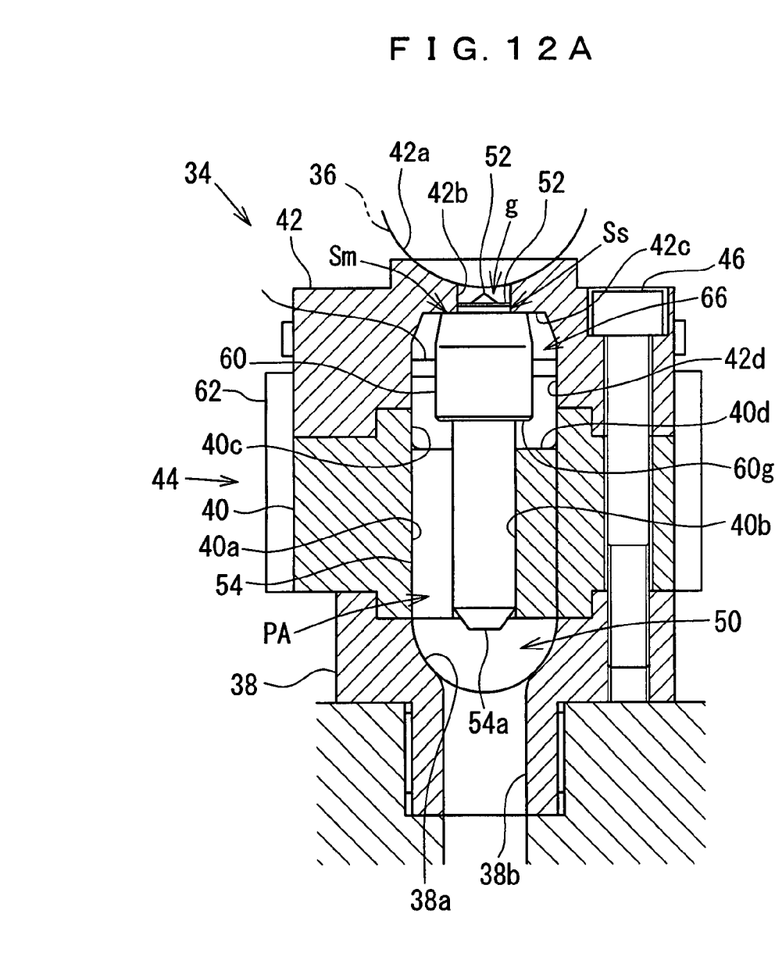
FIGS. 12A-12B show an expanded view of main structural elements of further another applied example of the hot runner sprue according to the embodiment of the present invention, with FIG. 12A being a view showing a state where supply of resin from the molding machine nozzle is stopped, and FIG. 12B being a view showing a state where resin is supplied from the molding machine nozzle.
Figure 12B:
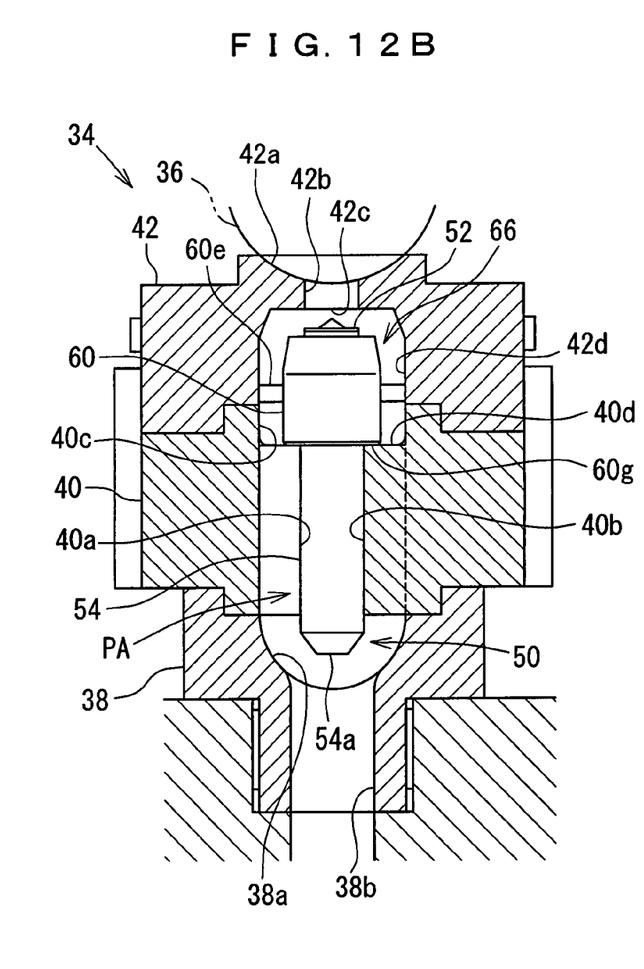
Figure 13A:
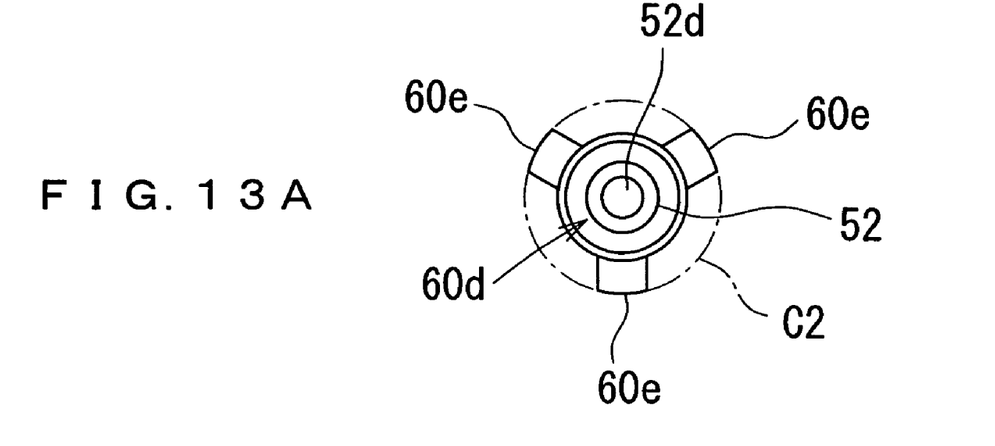
FIGS. 13A-13B show a slide pin of the hot runner sprue of FIG. 12, with FIG. 13A being a top view of the slide pin, and FIG. 13B being a side view thereof.
Figure 13B:
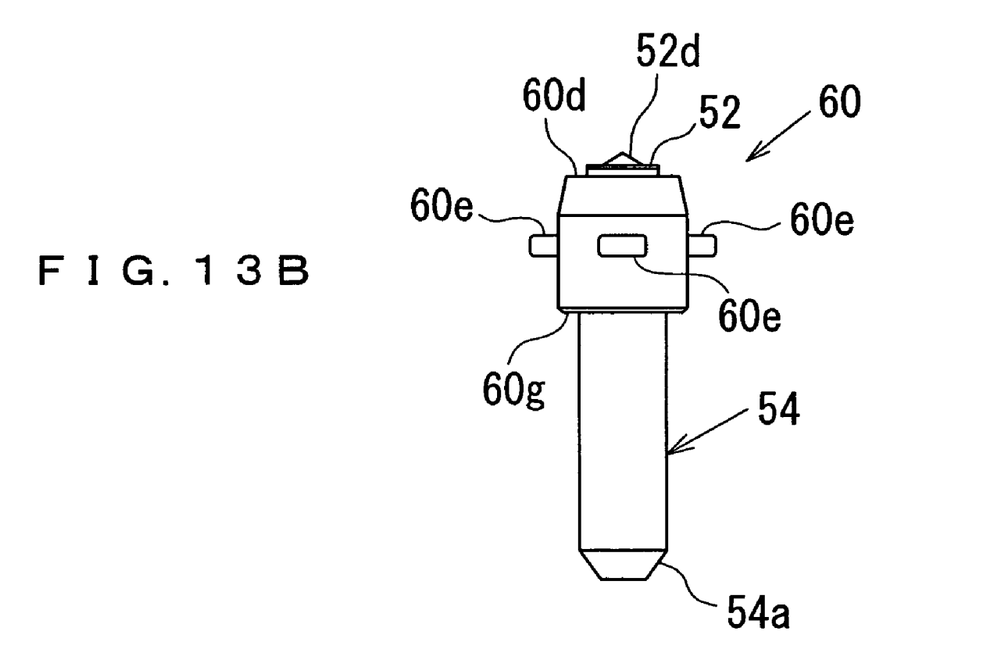

Further, an embodiment shown in FIGS. 12A to 13B may be adopted. In this embodiment, the deep spot facing 42f and the protrusion 60j of FIG. 10 as well as the chamfered surface 42g and the protrusion 60h of FIG. 11 are omitted, and the area required for seal Sm is fully secured, while a height of a protruded sub-slide pin 52 is set lower than that of a part extending from a stepped portion 42c to a nozzle touch surface 42a of a resin supply passage 50 as shown in FIG. 12A, instead of forming the upper surface of the sub-slide pin 52 fixed on the upper surface 60d of the cap 60 as the inverted-dome shaped recessed surface 52c as shown in FIGS. 1A to 11.

In this embodiment, a fine gap g is formed between the nozzle touch surface 42a and the sub-slide pin 52, that is, the sub-slide pin 52 does not seal the opening from the inside thereof with a flush surface being formed with the nozzle touch surface 42a. However, it is confirmed by the present inventors that even if air resulting from the fine gap g enters into the resin, no silver streak is formed in the molded part. Therefore, the above-mentioned shape of the sub-slide pin 52 can be adopted as a variation of tip shape of the sub-slide pin 52.

Furthermore, a conical projection 52d is formed on the upper surface of the sub-slide pin 52. The conical projection 52d is formed so that the tip of the conical projection 52d does not protrude from the nozzle touch surface 42a in a state where the whole of the sub-slide pin 52 is inserted into an opening 42b. This prevents the molding machine nozzle 36 placed into contact with the nozzle touch surface 42a from being clogged with the tip of the conical projection 52d. In addition, the conical projection 52d makes the resin provided from the molding machine nozzle flow smoothly, and thus resin flowability in the resin supply passage 50 can be improved. Further, reduction of ribs 60e constituting pressure receiving portion Pr (refer to FIG. 8) in the number to three from four in FIG. 7 also contributes to an improvement of resin flowability in the resin supply passage 50.

Note that, also in case where the shape of the sub-slide pin of FIGS. 12A-12B and 13A-13B is adopted in examples of FIGS. 1A to 11, the action and effect similar to the above can be exerted.

What is claimed is:

1. A hot runner sprue that serves as a connector that connects with a molding machine nozzle and that feeds resin supplied from the molding machine nozzle to a manifold of a hot runner block, comprising:
   a hot runner sprue main body that is formed with a nozzle touch surface that touches the molding machine nozzle and a resin supply passage connecting to the manifold and having an opening at one end that opens to the nozzle touch surface, and
   a seal, provided in the resin supply passage, that does not obstruct resin flow when resin is being supplied from the molding machine nozzle, and that receives back pressure of resin in the resin supply passage when supply of resin from the molding machine nozzle is stopped and seals the opening of the resin supply passage from the inside of the resin supply passage.

2. The hot runner sprue according to claim 1, wherein
a stepped portion having a diameter that increase discontinuously is formed in the resin supply passage, the stepped portion being formed in the resin supply passage between the opening and the manifold, and
the seal includes a main seal that is moved from the manifold side of the resin supply passage to the opening side and that is placed into contact with a shoulder of the stepped portion of the resin supply passage, and an auxiliary seal protruding from the main seal and that fits without clearance against a portion extending from the stepped portion to the opening of the resin supply passage.

3. The hot runner sprue according to claim 2, wherein
the main seal of the seal includes a pressure receiving portion that ensures resin flow when resin is supplied from the molding machine nozzle, and that receives the back pressure of the resin in the resin supply passage when supply of resin from the molding machine nozzle is stopped.

4. The hot runner sprue according to either claim 2 or 3, wherein
a plurality of guide protrusions extending in a resin flow direction are formed on an inner wall of the resin supply passage, and the main seal of the seal is a slide pin whose sliding movement is guided by the guide protrusions.

5. The hot runner sprue according to claim 2, wherein
the auxiliary seal of the seal is held by the main seal so as to be capable of protruding from/insertion within the main seal, and
the main seal is provided with a resin flow diverting means for causing the auxiliary seal to protrude from the main seal when supply of resin from the molding machine nozzle is stopped and back pressure of resin in the resin supply passage is applied to the auxiliary seal.

6. The hot runner sprue according to claim 5, wherein
the auxiliary seal is configured by a section of a sub-slide pin that slides within and is guided by a cylinder chamber formed in the main seal, and that is able to protrude from/insert within a tip of the main seal, and
the main seal is provided with a connecting hole connecting between the cylinder chamber and the resin supply passage and that functions as the resin flow diverting means.

7. The hot runner sprue according to claim 6, wherein
the main seal is supported by the guide protrusions formed in the inner wall of the resin supply passage so as to be capable of rotating about a central axis, and
the connecting hole is provided as one, two or more connecting holes, the connecting holes being formed at positions that are not blocked by the guide protrusions regardless of the rotational position of the main seal with respect to the resin supply passage.

8. The hot runner sprue according to either claim 6 or 7, wherein
a spring that urges the auxiliary seal in a direction in which the auxiliary seal protrudes from the main seal is provided in the cylinder chamber.

9. The hot runner sprue according to claim 8, wherein
a pressure receiving area of the pressure receiving portion of the main seal and an opening area of the connecting hole are determined such that the back pressure of resin received by the main seal exceeds the sum of the elastic force of the spring and the back pressure of resin received by the auxiliary seal in the cylinder chamber.

10. The hot runner sprue according to claim 2, wherein the auxiliary seal is formed so as to seal the opening of the resin supply passage from the inside of the resin supply passage with a flush surface being formed with the nozzle touch surface.

11. The hot runner sprue according to claim 2, wherein
the main seal and the auxiliary seal are formed as an integrated unit in which the auxiliary seal is fixed protruding from the main seal.

12. The hot runner sprue according to claim 10, wherein
one of a ring-shaped and a groove-shaped by-pass passage is provided in the shoulder of the stepped portion of the resin supply passage such that resin flow when resin is being supplied from the molding machine nozzle is ensured in a state where a section of the auxiliary seal is inserted to fit against the portion extending from the stepped portion to the opening.

13. The hot runner sprue according to claim 11, wherein
a protrusion having a shape that matches that of the by-pass passage is formed in a surface of the main seal, the protrusion being formed in the surface that faces the shoulder of the stepped portion of the resin supply passage, and being capable of occupying the by-pass passage.

14. The hot runner sprue according to claim 11, wherein the auxiliary seal is formed so as to seal the opening of the resin supply passage from the inside of the resin supply passage with a flush surface being formed with the nozzle touch surface.

15. The hot runner sprue according to claim 11, wherein the protruded auxiliary seal is formed lower than a portion extending from the stepped portion of the resin supply passage to the nozzle touch surface.

16. The hot runner sprue according to claim 15, wherein a conical projection is provided on an upper surface of the auxiliary seal.

* * * * *